(12) United States Patent
Crane

(10) Patent No.: US 7,591,718 B2
(45) Date of Patent: Sep. 22, 2009

(54) METHOD AND APPARATUS FOR PROCESSING ANIMALS

(75) Inventor: Jeffrey A. Crane, Warrenwood (AU)

(73) Assignee: MPSC, Inc., Hudson, WI (US)

( * ) Notice: Subject to any disclaimer, the term of this patent is extended or adjusted under 35 U.S.C. 154(b) by 74 days.

(21) Appl. No.: 11/657,843

(22) Filed: Jan. 25, 2007

(65) Prior Publication Data
US 2007/0197154 A1    Aug. 23, 2007

(51) Int. Cl.
*A22B 3/00* (2006.01)
(52) U.S. Cl. ....................................................... 452/52
(58) Field of Classification Search .................. 452/71, 452/74, 76, 77, 173
See application file for complete search history.

(56) References Cited

U.S. PATENT DOCUMENTS

| | | | | |
|---|---|---|---|---|
| 3,649,996 A | * | 3/1972 | Marti | 452/65 |
| 4,053,963 A | * | 10/1977 | Matheu | 452/67 |
| 4,314,386 A | | 2/1982 | Easthope et al. | |
| 4,774,741 A | | 10/1988 | Bernhardt et al. | |
| 5,007,336 A | | 4/1991 | Bernhardt et al. | |
| 5,931,730 A | * | 8/1999 | Bernhardt et al. | 452/65 |
| 5,964,656 A | * | 10/1999 | Lawler, Jr. et al. | 452/173 |
| 6,196,912 B1 | * | 3/2001 | Lawler et al. | 452/173 |

FOREIGN PATENT DOCUMENTS

| | | |
|---|---|---|
| EP | 0 471 470 | 2/1992 |
| WO | WO 99/59393 | 11/1999 |
| WO | WO 01/60169 | 8/2001 |

OTHER PUBLICATIONS

Form PCT/ISA/210 International Search Report for PCT/AU2004/001623.

* cited by examiner

*Primary Examiner*—Thomas Price
(74) *Attorney, Agent, or Firm*—Brooks, Cameron & Huebsch, PLLC

(57) ABSTRACT

The present invention provides a method for processing animals. The method includes providing a carrier for holding a plurality of animals; providing a multi-task station; locating an animal on at least part of the carrier at the multi-task station; weighing the animal at the multi-task station; providing a volume of rinse solution for introduction into the circulatory system of the animal, wherein the volume of rinse solution is based on the weight of the animal; and initiating a rinse of the animal prior to weighing a subsequent animal at the multi-task station. The invention also provides an animal processing system and a multi-task station suitable for use in accordance with the method.

14 Claims, 11 Drawing Sheets

METHOD AND APPARATUS FOR PROCESSING ANIMALS

FIELD OF THE INVENTION

The present invention relates to meat processing and more particularly to improvements in commercial processes that are used to slaughter and process animals to provide meat for human consumption.

BACKGROUND OF THE INVENTION

The commercial slaughter of animals to provide meat for human consumption is a carefully controlled process. Many meat processors use sophisticated tracking systems within their processing plants to enable the processor to track individual animals throughout the processing. In this way it is possible to address consumer concerns regarding the safety of animal processing by ensuring that each animal that enters the processing line is subjected to all of the necessary stages in the process.

A typical animal slaughtering process comprises stunning, weighing and bleeding an animal. U.S. Pat. No. 5,964,656 discloses an animal slaughtering process that also includes a step of rinsing blood from the circulatory system of an animal using the so called "Rinse and Chill™ technique". In this process, an animal is stunned following which it is hung on a shackle on an overhead rail or similar processing line. The stunned animal is then associated with a uniquely identifiable tag so that the progress of each animal through the bleeding and rinsing stages of the slaughtering process can be monitored. In some processing plants a radio frequency identification ('RFID') tag containing a unique identification code is fixed to the animal or shackle. After stunning and tagging, the animal is conveyed on the overhead rail to a weigh station where it is weighed. The weight of the animal is then recorded and is correlated with the unique identification code for that animal.

After weighing, the animal is moved on the overhead rail to a bleed station where an incision is made in the neck to bleed the animal. Following bleeding, the animal is moved on the overhead rail to a rinse station where a rinse solution is introduced into the circulatory system of the animal to rinse out blood that has not drained out of the circulatory system. To do this, a catheter or nozzle is usually inserted into an artery or vein of the animal. The rinse solution is then injected through the nozzle into the circulatory system of the animal whereby the solution forces residual blood out of the animal. The volume of solution that is rinsed through the animal is predetermined and may be based on the weight of the animal. The administration of solution is carefully monitored and controlled. The weighing, bleeding and rinsing stages of the process are typically computer controlled and the RFID tag containing a unique identification code plays an important role in the process.

The aforementioned process is carried out on commercial scale whereby hundreds of animals may be processed per hour in a typical processing plant. On such a scale it is important that the process be as efficient as possible. However, whilst there is a need for efficiency in the process, there is also a need to carry out the process under strict guidelines in order to meet health regulations and consumer expectations and concerns. The processing of animals on a commercial scale is therefore a balance between minimising the processing time and cost in order to maximise efficiency, and maximising control of the process in order to comply with health regulations and consumer expectations.

The present invention provides a process that is able to improve the efficiency of currently used commercial animal slaughter processes that involve weighing and/or bleeding and rinsing of the animals.

All references, including any patents or patent documents, cited in this specification are herein incorporated by reference. However, no admission is made that any reference, including any patent or patent document, cited in this specification constitutes prior art. In particular, it will be understood that, unless otherwise stated, reference to any document herein does not constitute an admission that any of these documents forms part of the common general knowledge in the art in any country.

SUMMARY OF THE INVENTION

The present invention provides a method for processing animals, the method including:
  providing a carrier for holding a plurality of animals;
  providing a multi-task station;
  locating an animal on at least part of the carrier at the multi-task station;
  weighing the animal at the multi-task station;
  providing a volume of rinse solution for introduction into the circulatory system of the animal, wherein the volume of rinse solution is based on the weight of the animal; and
  initiating a rinse of the animal prior to weighing a subsequent animal at the multi-task station.

The present invention also includes a method for processing animals, the method including:
  providing a carrier for holding a plurality of animals;
  providing a multi-task station;
  locating an animal on at least part of the carrier at the multi-task station;
  bleeding the animal at the multi-task station;
  providing a volume of rinse solution for introduction into the circulatory system of the animal, wherein the volume of rinse solution is based on an estimated weight of the animal; and
  initiating a rinse of the animal prior to a subsequent animal entering the multi-task station.

The method may include providing a weight scale at the multi-task station, weighing each animal at the multi-task station to determine the weight of the animal, and calculating a volume of rinse solution based on the actual weight of the animal.

The method may also include bleeding the animal at the multi-task station.

A single operator may perform the operations at the multi-task station, such as weighing, bleeding and rinsing. The operator has all of the tools necessary to carry out the weighing, bleeding and rinsing stages within reach of the multi-task station so that all operations can be carried out without the need for either the operator or the animal to move from the multi-task station. However, it will be appreciated that some movement of the animal within the multi-task station may be possible. For example, the animal may be weighed on a weight scale and then moved from the weight scale to an area immediately adjacent the weight scale, at which point the rinse may be initiated. Another animal is not placed on the weight scale until a rinse is initiated.

It has been found that substantial processing efficiencies can be achieved by using the method of the present invention compared to currently used methods that involve weighing and bleeding and then rinsing the animal. The current methods require the animal to be weighed at a weigh station and then conveyed to a separate bleed station and then to a separate rinse station. The transfer of animals along the processing line in this way requires the animal to be tagged so that the weight of the animal determined at the weigh station can be correlated with the volume of the rinse solution to be injected into the animal at the rinse station. Using the process of the present invention there is no need to tag the animals, resulting in considerable improvements in process efficiency, process reliability, and cost savings.

Using the methods of the present invention an animal may be bled before it is weighed. Specifically, the animal may be bled before it is conveyed to the multi-task station where it is weighed and a rinse is initiated. Alternatively, the animal may be bled at the multi-task station. However, it is also possible for the animal to be bled after it is weighed, in which case the animal will be bled at the multi-task station.

The carrier may be selected from the group consisting of: an overhead rail, an overhead chain, a moving table, a plurality of cradles or a plurality of knock boxes. When the carrier is an overhead rail, the method may further include attaching the animal to a shackle, providing a hoist, hoisting the animal to the overhead rail and conveying the animal to the multi-task station.

Instead of hoisting the animal on a shackle to the overhead rail the method may include providing a plurality of cradles, locating an animal in a first cradle at the multi-task station, weighing the animal in the first cradle at the multi-task station to determine the weight of the animal, calculating a volume of rinse solution based on the actual weight of the animal, initiating a rinse of the animal in the first cradle at the multi-task station, removing the animal in the first cradle from the multi task station; and the procedure is then repeated with another animal in at least one subsequent cradle. In this embodiment, each cradle is part of the carrier which comprises a plurality of cradles.

The method may also include the use of a knock box in the same way as the cradle is used.

Using the methods of the present invention, rinsing of the animal may be initiated at the multi-task station and the rinse completed at the multi-task station. Alternatively, the rinsing may be initiated at the multi-task station and the animal may then be conveyed on the processing line from the multi-task station as the rinse solution is introduced into the circulatory system of the animal. The rinse may be initiated at the multi-task station, after the animal has been moved from the weight scale to an area immediately adjacent the weight scale. After the rinse has been initiated and the animal has been moved from the multi-task station, the next animal may be conveyed into the multi-task station for weighing and/or bleeding and/or rinsing whilst the rinse of the earlier animal is continued.

The present invention also provides an animal processing system comprising:
  a carrier for holding a plurality of animals; and
  a multi-task station where an animal on at least part of the carrier is weighed, and then a rinse is initiated before a subsequent animal is weighed.

The present invention also provides an animal processing system comprising:
  a carrier for holding a plurality of animals; and
  a multi-task station where an animal on at least part of the carrier is bled, and then a rinse comprising a volume of a rinse solution based on at least an estimated weight of the animal is initiated before a subsequent animal enters the multi-task station.

The present invention further provides a multi-task station for processing animals, the multi-task station including:
  a weight scale for weighing an animal to determine the weight of the animal; and
  a rinse station providing a rinse solution for introduction into the circulatory system of the animal at the multi-task station, and
  control means for preventing a subsequent animal from being weighed before the rinse solution has been initiated for the animal that has been weighed.

In one form of the invention, the multi-task station includes a weight scale and a rinse station. In another form of the invention, the multi-task station includes a bleeding station and a rinse station. In still another form of the invention, the multi-task station includes a weight scale, a bleeding station and a rinse station, wherein the animal does not need to be moved between the weight scale, the bleeding station and the rinse station for processing.

BRIEF DESCRIPTION OF THE FIGURES

The illustrative embodiment may be described by reference to the accompanying drawings where.

Figure 1:
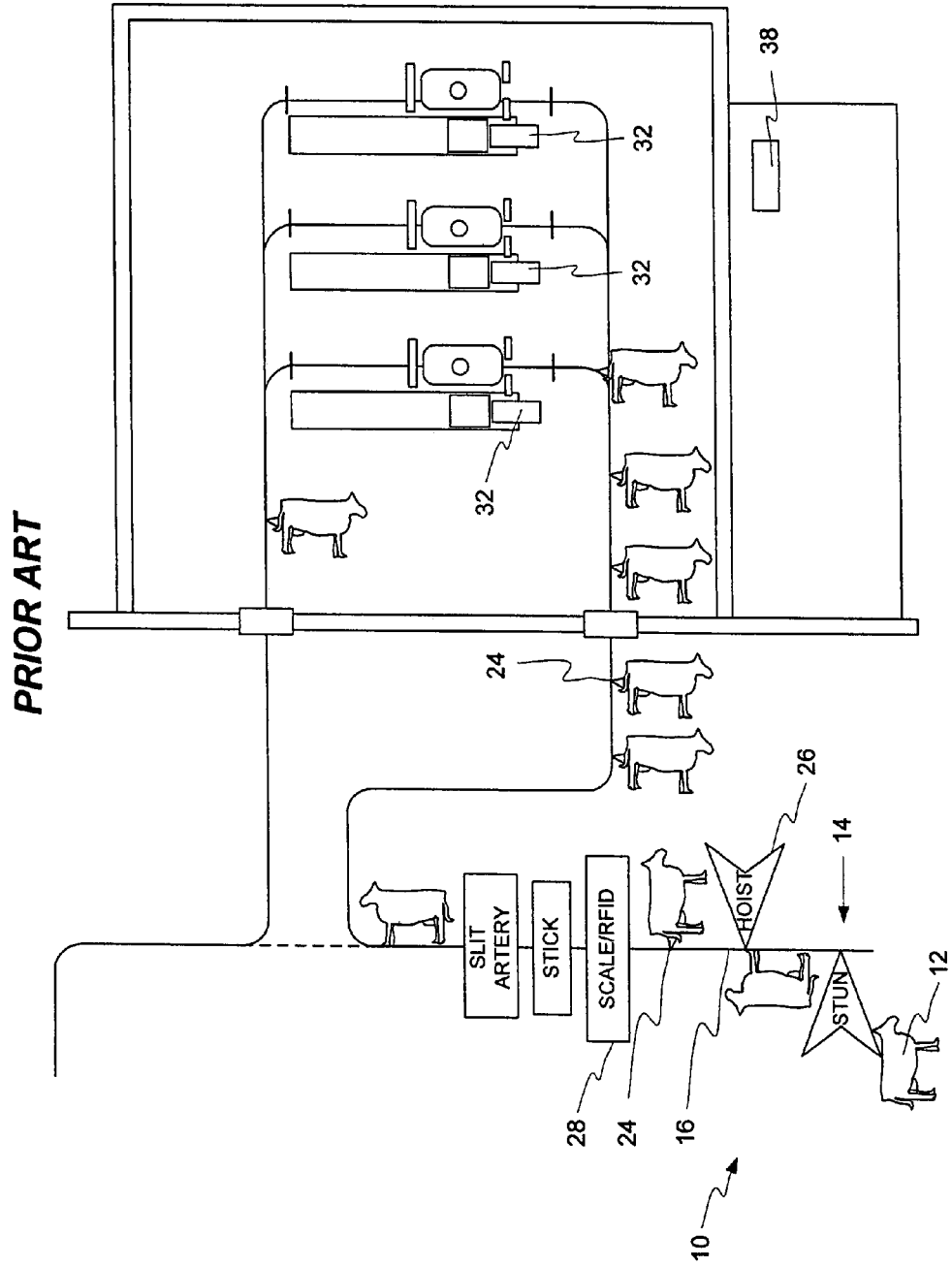
FIG. 1 is an overhead schematic of a prior art animal processing system as described in U.S. Pat. No. 6,196,912 which is incorporated by reference hereto.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "side," "end," "bottom," "first," "second," "laterally," "longitudinally," "row," "column," and similar terms are used herein, it should be understood that these terms have reference only to the structure shown in the drawings as it would appear to a person viewing the drawings and are utilized only to facilitate describing the illustrative embodiment.

DETAILED DESCRIPTION OF THE INVENTION

To illustrate embodiments of the present invention the following discussion refers to the animals being processed as bovine. However, the invention may be applied to animals that are members of a variety of groups including bovine, ovine, swine, poultry, or fish.

The animal processing method and apparatus 10 is shown schematically in a processing line in the Figures. The processing line is used to convey and/or hold animals for processing.

The animal processing method and apparatus 10 may be computer controlled, similar to that described in U.S. Pat. No. 6,196,912. The basic procedures for animal processing, such as stunning, weighing, bleeding, and rinsing that are illustrated in the embodiments of the invention described herein, are also the same as those described in U.S. Pat. No. 6,196, 912. However, the location at which at least some of the procedures are carried out within a processing factory or slaughterhouse differs in the case of the present invention. As a result, at least one embodiment the present invention provides a method in which there is no need to use RFID tags to correlate a particular animal 12 with a volume of rinse solution, thereby resulting in improvements in process efficiency, process reliability, and cost savings.

Referring to the accompanying Figures, an animal proceeds through the various stages of processing on a processing line. Initially, an animal 12 is stunned in a stunning area 14 to render it irreversibly unconscious. The process of stunning the animal 12 for slaughter is known within the art. A carrier is then used to hold the stunned animal 12 for further processing. In the embodiment of the invention that is shown in the Figures, the carrier is in the form of an overhead rail 16, a plurality of cradles 18, a plurality of knock boxes 20, or a moving table 22. In the embodiment of the invention that is shown in FIGS. 2 to 7, the carrier is an overhead rail 16. In this embodiment, the stunned animal is attached to a shackle 24 by one of the rear legs. A hoist 26 is then used to hoist the shackle 24 on to the overhead rail 16 to suspend the animal 12 from the overhead rail 16 in an inverted position. This method of rail-shackle mounting is known in the art. Other carriers that could be used in the place of the overhead rail include an overhead chain, a moving table, a plurality of cradles, or a plurality of knock boxes. As used herein the term "at least part of the carrier" refers to a section of overhead rail or overhead chain, or a cradle or knock box when the carrier is a plurality of cradles or knock boxes. As such, the "at least part of the carrier" is that part that is holding the animal at the multi-task station.

In the processing method described in U.S. Pat. No. 6,196, 912 the suspended animal is weighed on a weight scale 28, an RFID tag is attached to the animal or shackle and the animal is conveyed to a bleeding station 30. The animal is then conveyed to a rinse station 32 where residual blood is rinsed from the circulatory system of the animal.

FIGS. 2 to 9 show preferred embodiments of the present invention.

Figure 3:
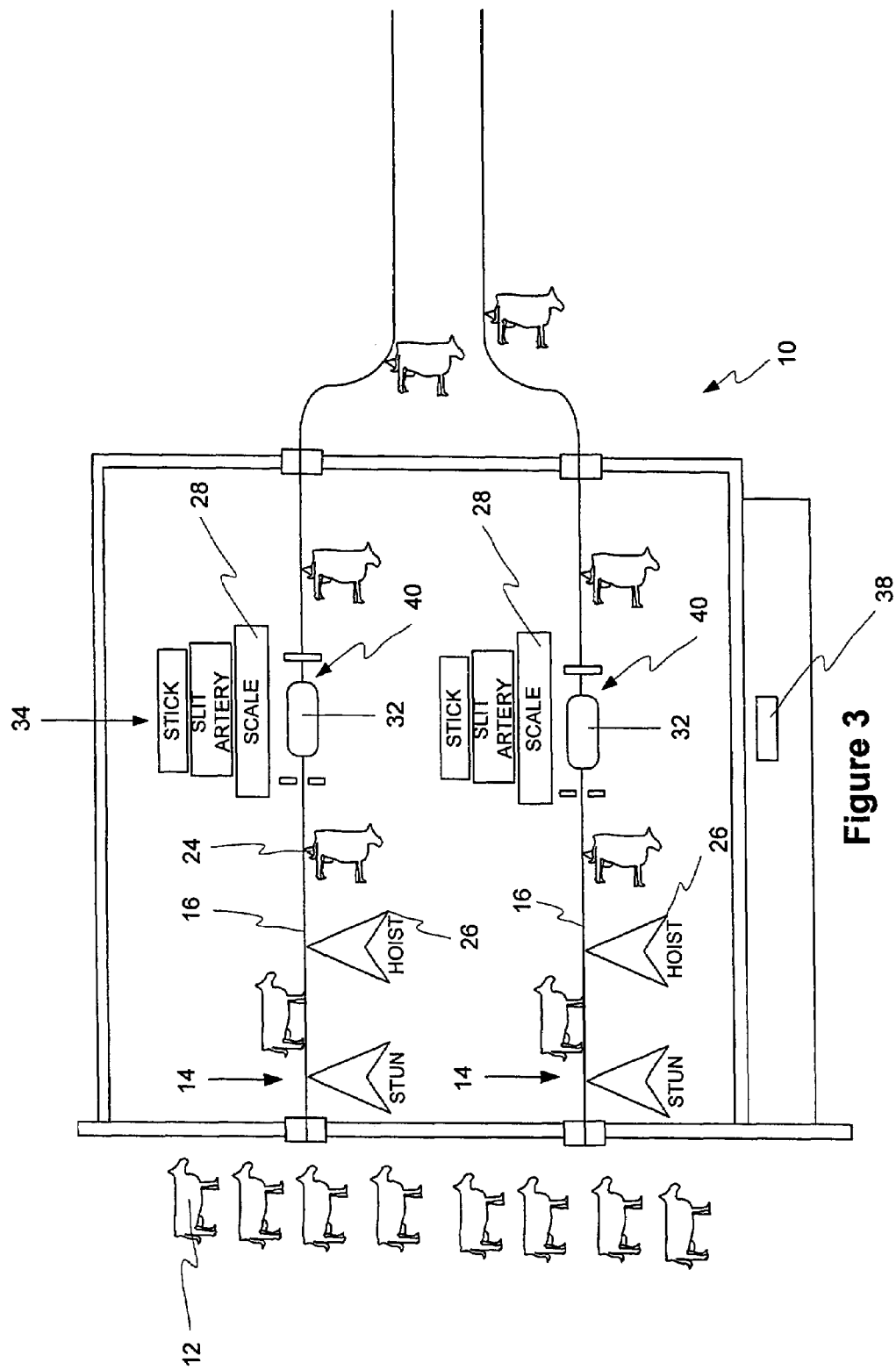
FIG. 3 is an overhead schematic of another embodiment of an animal processing system of the present invention.

According to the method of the present invention, once an animal 12 has been appropriately suspended it is conveyed along the overhead rail 16 to locate it at a multi-task station 34, which is separated from the stunning area 14. A processing factory may have more than one overhead rail 16, as shown in FIG. 3. The multi-task station 34 contains a weight scale 28 for weighing the animal 12 and a rinse station 32, and in a typical process the animal is weighed and a rinse is initiated at the multi-task station. Thus, in one embodiment the method includes:

providing a carrier for holding a plurality of animals;
providing a multi-task station;
locating an animal on at least part of the carrier at the multi-task station;
weighing the animal at the multi-task station;
providing a volume of rinse solution that is based on the weight of the animal; and
initiating a rinse prior to weighing a subsequent animal at the multi-task station.

In a preferred embodiment the multi-task station 34 includes a bleeding station 30 and the animal is bled at the multi-task station.

The weight scale 28 is an integral part of the overhead rail 16 in which a section of the overhead rail 16 has 2-4 load cells mounted onto it and a stop pin 36 is used to stop the shackle 24 and animal 12 on the weight scale 28 until the animal 12 is weighed. Once a stable weight reading is obtained, the actual weight of the animal 12 is recorded. This could be by writing the weight on the animal 12 or by recording the weight electronically. For example, the weight scale 28 could send the weight information to a processing means such as a computer 238, where the weight information may be stored in a database. The database may be used to record other details such as the shackle number, time and date.

Figure 5:
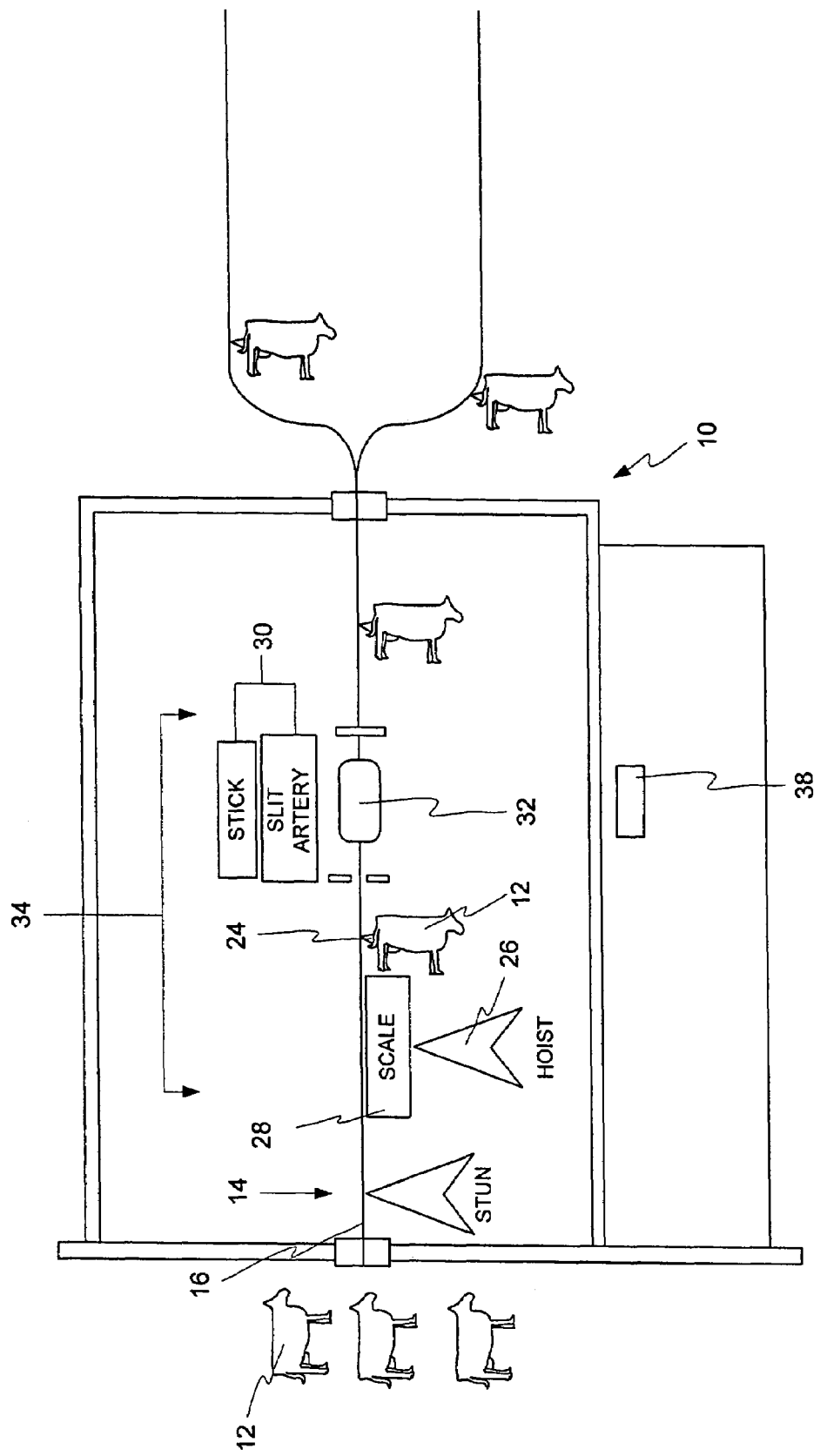
FIG. 5 is an overhead schematic of another embodiment of an animal processing system of the present invention having the weight scale on the hoist.

Preferably, the weight scale 28 is positioned as close to the hoist 26 as possible to minimize the time between these stations and to reduce space requirements. However, it is also important that the weight scale 28 is far enough away from the hoist 26 to keep the hoist area clear for the next animal 12 to be dropped safely. In an embodiment of the invention that is illustrated in FIG. 5, the weight scale 28 is part of the hoist 26 so that the weight of an animal is obtained whilst the animal is being hoisted.

After the weight has been obtained, the animal 12 is bled at the multi-task station 34 without moving the animal 12 any further along the overhead rail 16.

The animal 12 is bled in a procedure that is known in the art. In a preferred embodiment of the invention, the animal 12 is bled through a vessel such as the jugular veins and/or any other open cuts on the animal 12. A blood pit 40 is positioned under the animal 12 to collect blood that drains from the animal 12. It will be appreciated that reference to the bleeding of an animal herein means the act of severing necessary arteries prior to rinsing. As such the "bleeding" of the animal does not necessarily refer to the draining of all of the blood from the animal. Indeed, in most cases residual blood is drained from the animal when it is rinsed.

Figure 7:
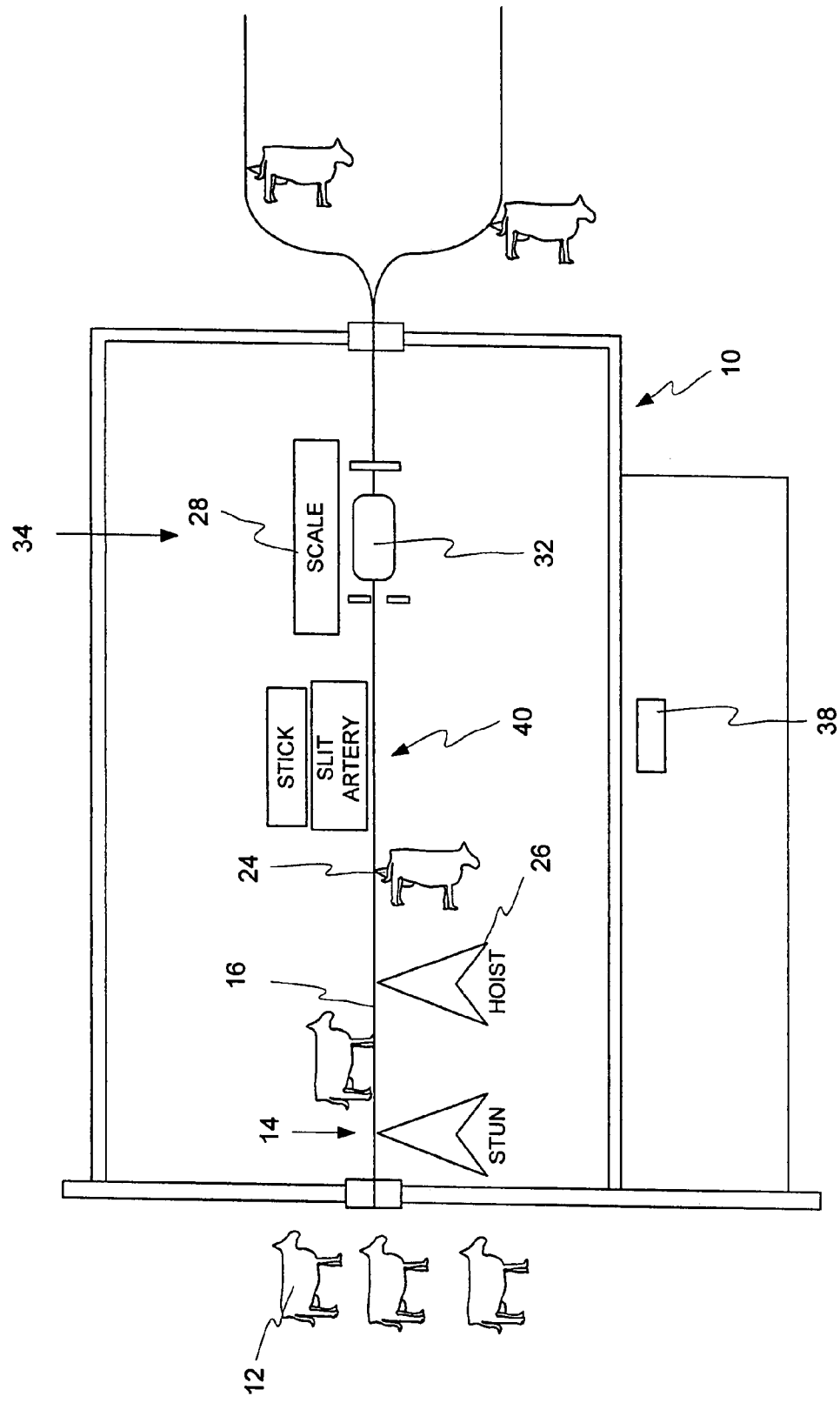
FIG. 7 is an overhead schematic of another embodiment of an animal processing system of the present invention having a bleeding station before the multi-task station.
Figure 11:
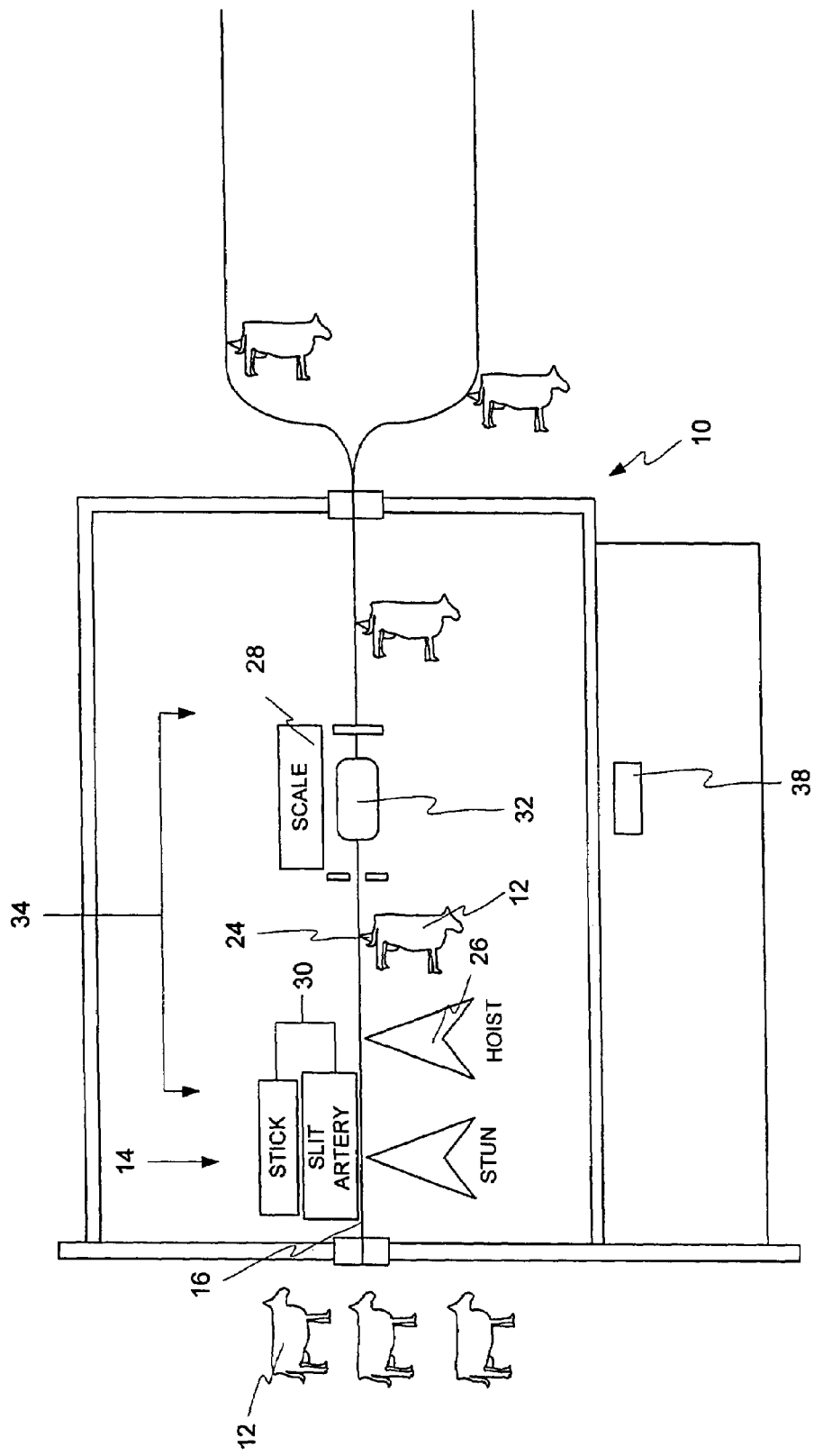
FIG. 11 is an overhead schematic of another embodiment of an animal processing system of the present invention.

In an alternative embodiment, the suspended animal 12 is conveyed on the overhead rail 16 to locate it at the multi-task station 34 where it is bled using a standard procedure before it is weighed. After bleeding and weighing, the animal 12 is rinsed. Alternatively, as illustrated in an embodiment of the invention that is shown in FIG. 7, the animal 12 may be bled at a bleeding station 30 using a standard procedure before it is conveyed on the overhead rail 16 to the multi-task station 34 where it is weighed on the weight scale 28. After weighing the animal is rinsed as described in more detail below. In another embodiment that is shown in FIG. 11, the animal 12 is stunned and bled immediately using the bleeding station 30 which is located at the stunning area. The animal is then hoisted onto the overhead rail 16 and conveyed to the multi-task station 34 where it is weighed and rinsed.

In each case, the rinse is initiated before another animal 12 reaches the weight scale 28. To achieve this, the multi-task station 34 includes a control means 42 in the form of actuated pins that are used to ensure that a subsequent animal does not reach the weight scale 28 before a rinse has been initiated. An actuated pin 44 is placed prior to the weight scale 28. This actuated pin 44 prevents newly suspended animals 12 from entering the weight scale 28 unless a hose and nozzle has been associated with the animal that has been weighed. Pin 44 may be actuated by a signal received from the rinse station 32. This arrangement makes it possible for an animal 12 to move on from the weight scale 28 to where the operator can also insert the nozzle before a subsequent animal reaches the weight scale 28.

In another embodiment, the suspended animal 12 may be conveyed on the overhead rail 16 to the multi-task station 34 where it is bled using a standard procedure. After bleeding, the animal 12 is rinsed without weighing. This may happen, for example, when the weight scale is not operative. Usually, the amount of rinse solution that is introduced into the circulatory system of an animal is calculated based on the measured weight of the animal. However, when the animal is not weighed before rinsing, a volume of rinse solution that is based on an estimated weight of the animal may be used. When the weight scale 28 is not used, the weight of an animal may be estimated based on an average weight for the group of animals of which the particular animal is a member. For example, the total weight of a group of animals may be known and therefore an average weight per animal may be calculated based on the total weight of the group. In this form the method of the present invention includes:

providing a carrier for holding a plurality of animals;
providing a multi-task station;
locating an animal on at least part of the carrier at the multi-task station;
bleeding the animal at the multi-task station;
providing a volume of rinse solution that is based on an estimated weight of the animal; and
initiating a rinse prior to a subsequent animal entering the multi-task station.

The multi-task station 34 includes a rinse station 32. The rinse station 32 includes at least one hose and an attached nozzle assembly. Each nozzle assembly further has an attached secured sanitary catheter as disclosed in U.S. Pat. No. 5,931,730. Each hose is connected to a vessel containing rinse solution. A pump is used to deliver rinse solution from the vessel through the hose to the nozzle assembly. The pump delivers the rinse solution at a relatively constant pressure.

Any suitable rinse solution can be used in the method of the present invention. The rinse solution may be an aqueous solution such as any one of the solutions referred to in U.S. Pat. No. 4,946,692 and variations of those solutions. A commercially available aqueous sugar/salt solution may be used.

The hoses, nozzle assemblies, and the operators hands are sanitized before use. The rinse station 32 includes a rinse control means for monitoring and controlling flow of rinse solution. The rinse control means includes one or more sanitation sensors for registering that the nozzle assembly and the operator's hands are sanitised before the rinse. The rinse control means allows flow of rinse solution only when the sanitation sensors have registered that the nozzle assembly and the operator's hands have been sanitized. Suitable rinse control means and sanitation sensors are disclosed in U.S. Pat. No. 5,964,656.

After sanitizing their hands and arms, the operator locates a suitable vessel of the animal 12 in which to place the nozzle and introduces the rinse solution. A volume of rinse solution to be delivered is usually calculated based on the weight of the animal 12. In one embodiment of the invention, the volume of rinse solution used is equal to up to 10% of the weight of the animal 12 and is introduced through a suitable vessel such as the carotid artery of the animal 12.

In this preferred embodiment, to introduce the rinse solution into the circulatory system of the animal 12 a valve is actuated to allow the rinse solution to fill the hose and nozzle. Once the hose and nozzle are enabled with rinse solution, the operator inserts the nozzle into a suitable vessel such as the carotid artery of the animal 12. Upon proper insertion, the operator manually opens another valve to begin the flow of rinse solution into the circulatory system of the animal 12. As the animal 12 is being rinsed, the flow of rinse solution is monitored using flow meters in the rinse station 32. The calculated volume of the rinse solution is allowed to flow through the circulatory system of the animal 12 and drain out of suitable vessels such as the jugular veins of the animal 12. Once the calculated volume of rinse solution has been administered, the valve in the rinse station 32 which was supplying rinse solution to the hose is closed. The operator then removes the nozzle from the animal 12. The rinsed animal 12 is then conveyed on overhead rail 16 to a further processing station, where operations such as skinning and boning are carried out.

Figure 4:
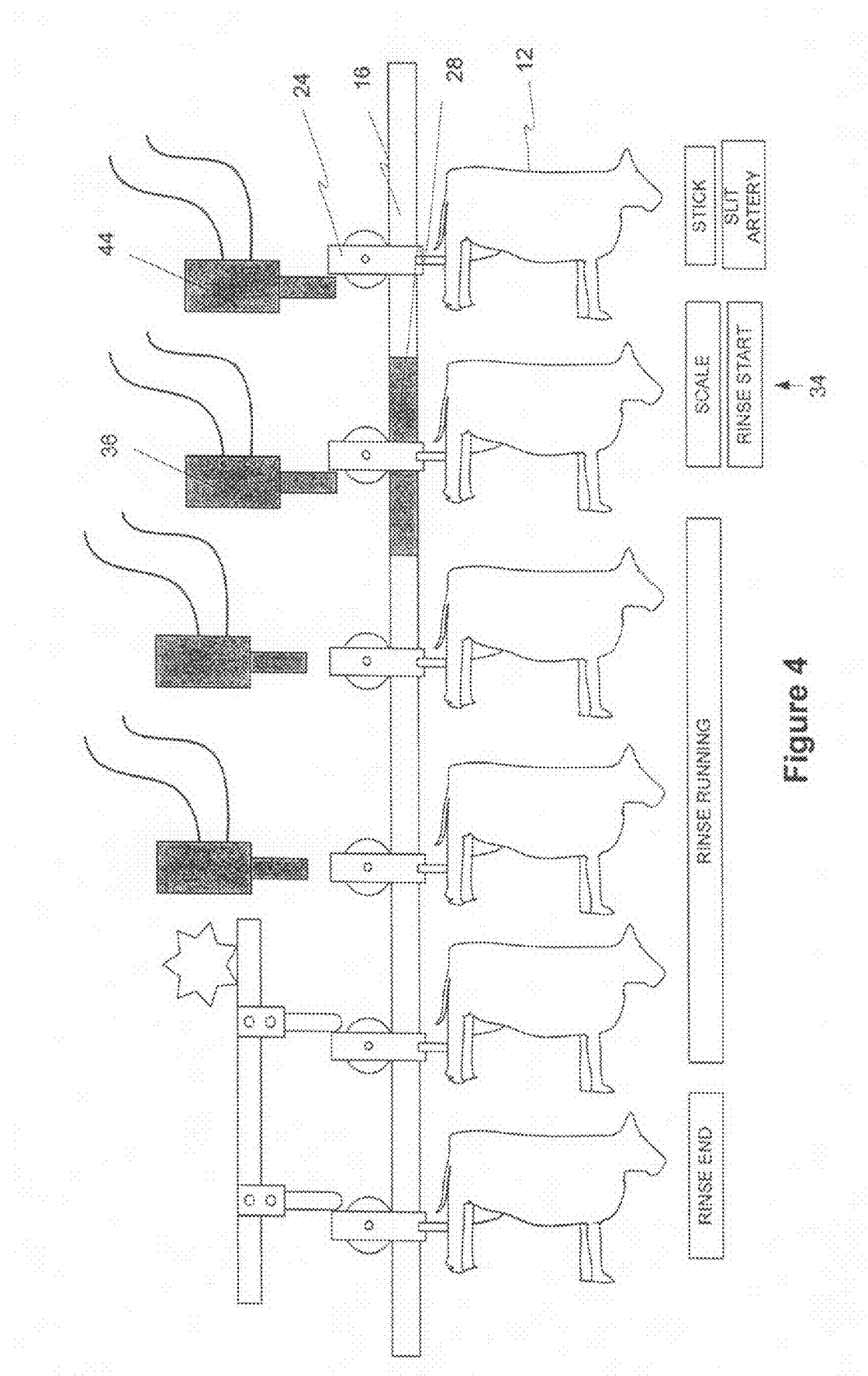
FIG. 4 is a schematic side view of another embodiment of an animal processing system of the present invention.

As used herein, the term "initiating a rinse", or similar terminology, means assigning a volume to a hose for an animal. The term does not necessarily include inserting a nozzle and catheter into the animal and introducing the rinse solution into the animal. Thus, a rinse may be initiated by selecting a hose and nozzle assembly and enabling the selected hose with a volume of rinse solution that is calculated based on the weight of the animal. The hose and nozzle assembly is then associated with the animal that has just been weighed and at any point after that has happened a subsequent animal can safely be weighed. In another embodiment, the rinse may be started at the multi-task station 34 by inserting the nozzle assembly into the animal and starting the flow of rinse solution into the circulatory system of the animal 12 and the animal may then be conveyed along the overhead rail 16 toward the processing station whilst the rinse is in progress, as shown in FIG. 4.

Figure 6:
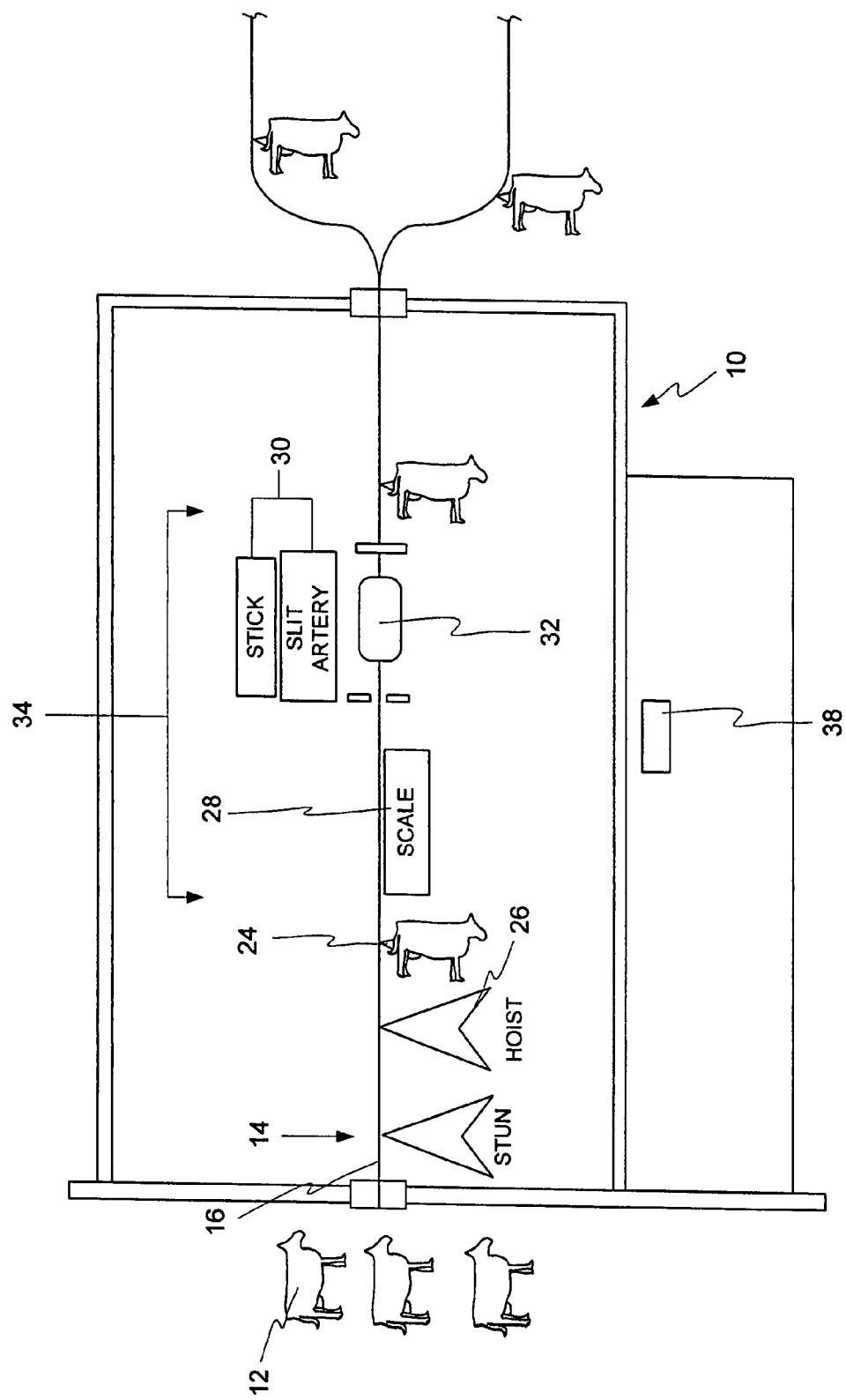
FIG. 6 is an overhead schematic of another embodiment of an animal processing system of the present invention having the rinse station and bleeding station separated from the weight scale.

In a further embodiment that is illustrated in FIG. 6, an animal 12 is weighed at the multi-task station 34 and then moved from the weight scale 28 to an area immediately adjacent where the rinse is started before a subsequent animal reaches the weight scale.

In still another embodiment, an animal 12 is weighed at the multi-task station 34 and then a hose is enabled with rinse solution. The operator then inserts the nozzle into a vessel of the animal 12 and the rinse is started. After a preset volume of rinse solution has passed through the nozzle, the actuated pin 44 releases a subsequent animal on to the weight scale 28.

The multi-task station 34 may be operated by one or more operators.

Figure 8:
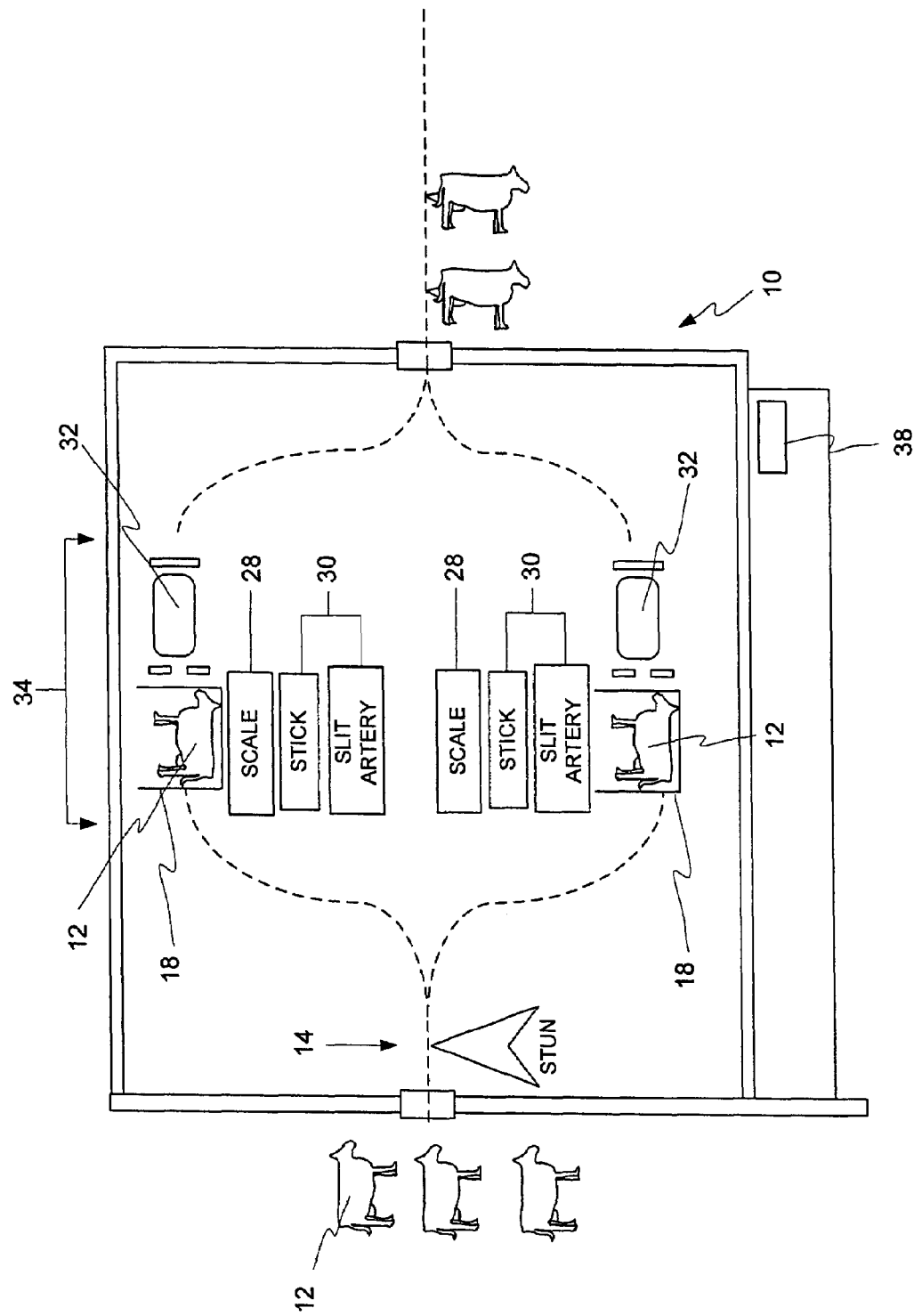
FIG. 8 is an overhead schematic of another embodiment of an animal processing system of the present invention having multiple cradles as the carrier.

In an embodiment of the invention that is illustrated in FIG. 8, the stunned animal 12 is not hoisted by shackle 24 onto the overhead rail 16, but it is held on its back in a cradle 18. The animal 12 is weighed at the weight scale 28 in the cradle 18, bled, and is also rinsed whilst it is in the cradle. After rinsing, the animal 12 is moved from the cradle 18 to a further processing station. In this embodiment the processing line comprises multiple cradles. Thus, the method may include:

(a) providing a plurality of cradles;
(b) locating an animal in a first cradle at the multi-task station;
(c) weighing the animal in the first cradle at the multi-task station to determine the weight of the animal;

(d) bleeding the animal;
(e) calculating a volume of rinse solution based on the weight of the animal;
(f) introducing the rinse solution into the circulatory system of the animal in the first cradle at the multi-task station;
(g) removing the animal in the first cradle from the multi-task station; and
repeating b) to f) with a subsequent animal and a second cradle.

Figure 9:
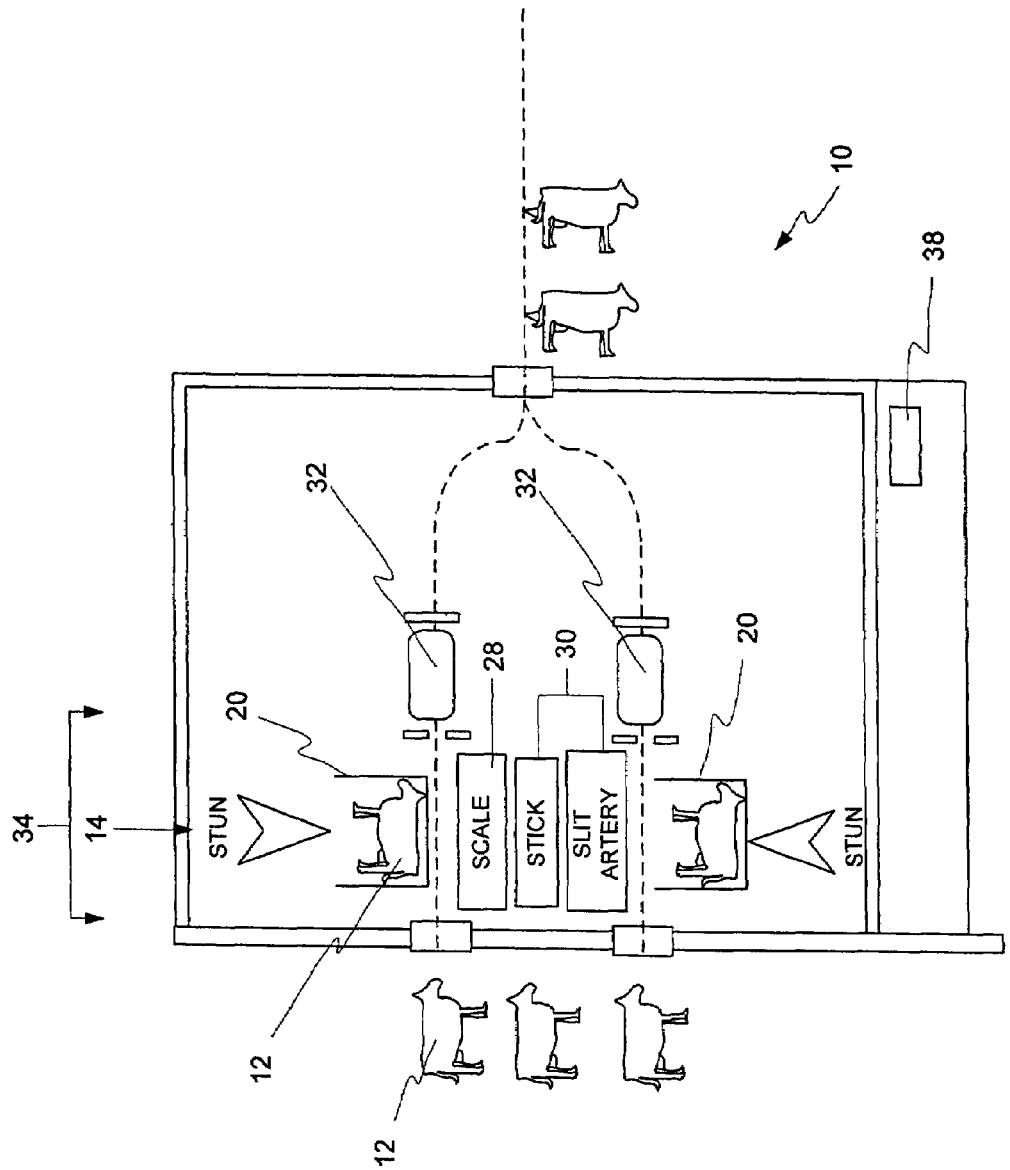
FIG. 9 is an overhead schematic of another embodiment of an animal processing system of the present invention having multiple knock boxes as the carrier.

In another embodiment that is illustrated in FIG. 9, the stunned animal 12 may be weighed, bled, and rinsed in a knock box 20 of the stunning area 14. In this embodiment the processing line comprises multiple knock boxes. Thus, the method may include:
(a) providing a plurality of knock boxes;
(b) locating an animal in a first knock box at the multi-task station;
(c) weighing the animal in the first knock box at the multi-task station to determine the weight of the animal;
(d) calculating a volume of rinse solution based on the weight of the animal;
(e) introducing the rinse solution into the circulatory system of the animal in the first knock box at the multi-task station;
(f) removing the animal in the first knock box from the multi-task station; and
(g) repeating b) to f) with a subsequent animal in a second knock box.

With cradles and knock boxes, the cradle or knock box may be used to convey the animal to the multi-task station, Alternatively, an animal in a cradle or knock box may be introduced to the multi-task station 34 by conveying the multi-task station 34 to individual cradles or knock boxes. After the animal has been weighed, bled and rinsed, the multi-task station 34 could then be moved to a subsequent cradle or knock box containing a subsequent animal, and so on.

Figure 10:
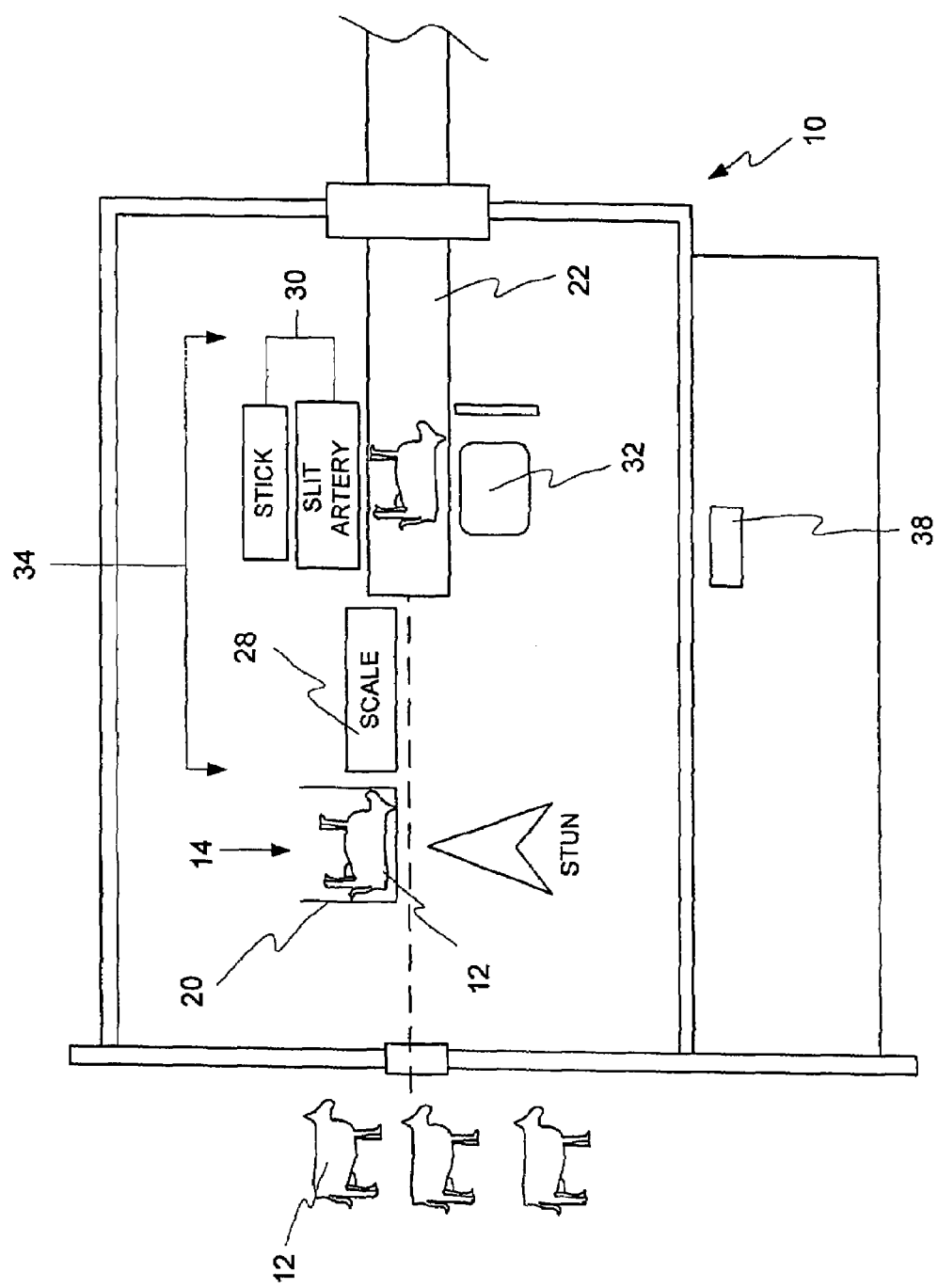
FIG. 10 is an overhead schematic of another embodiment of an animal processing system of the present invention having a moving table as the carrier.

In another embodiment that is illustrated in FIG. 10, the carrier is a moving table. In this embodiment, an animal 12 may be stunned in a knock box 20 before being transferred to the weight scale 28 for weighing. The weight scale 28 could be a scale attached to a cradle in which the animal is held for weighing. Alternatively, the animal could be weighed in the knock box 20. Alternatively still, the weight scale 28 may be a platform scale onto which the animal is transferred from the knock box 20. In each case after weighing, the animal may be transferred to the moving table 22. The rinse may be initiated whilst the animal is on the weight scale 28, or after it has been moved onto the moving table 22. However, a subsequent animal may not be placed on the weight scale 28 until the rinse has been initiated for the animal that has been weighed.

It is contemplated that a processing factory may have more than one multi-task station 34.

Figure 2:
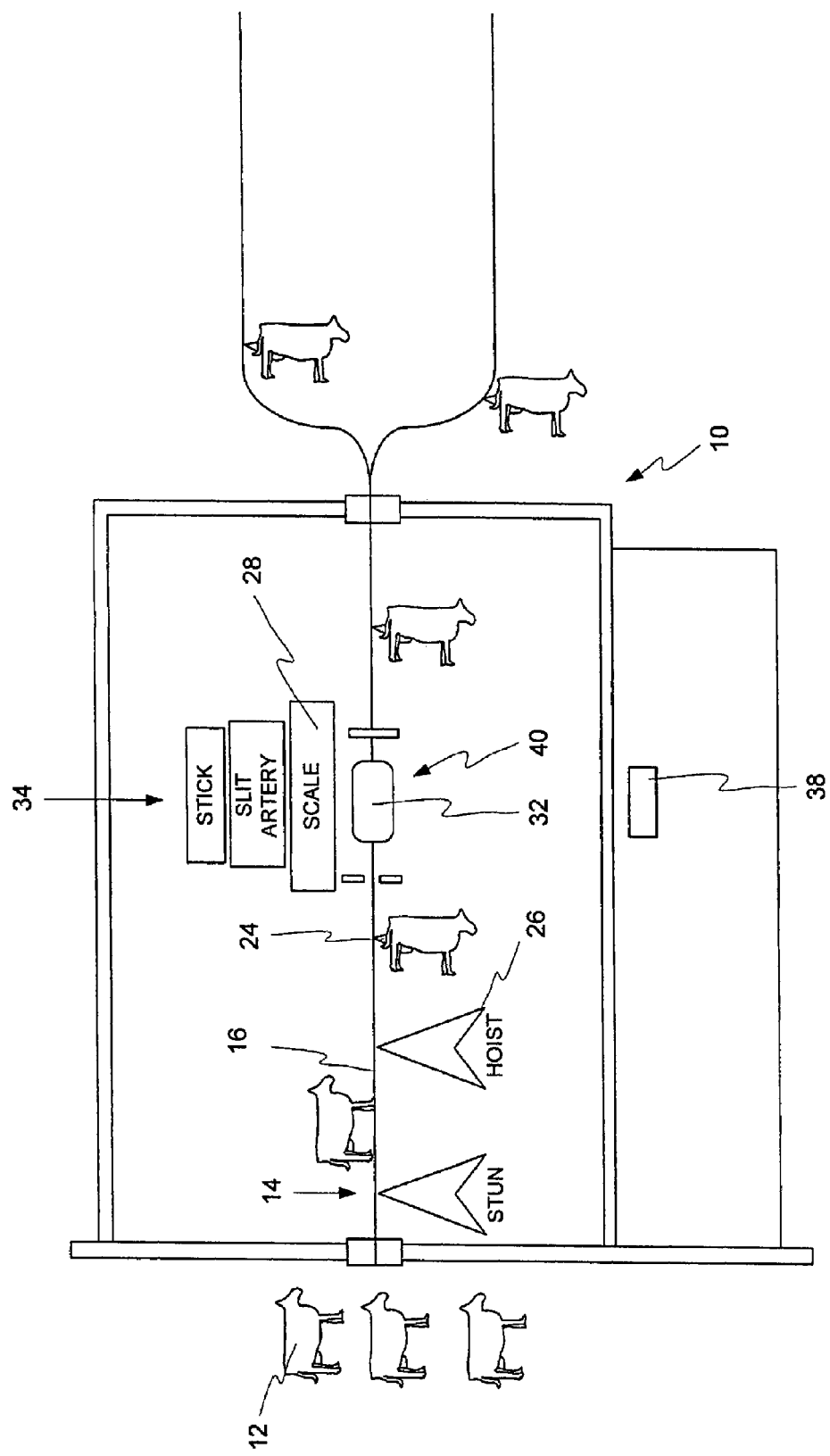
FIG. 2 is an overhead schematic of one embodiment of an animal processing system of the present invention.

As shown by comparison between FIG. 1 and FIGS. 2 and 3, the methods of the present invention are different to the existing slaughtering processes. In the methods of the present invention the animal 12 that has been stunned as described previously or by using other known methods, is conveyed to a multi-task station 34 at which point it is weighed and/or bled. If the animal has been weighed, a volume of rinse solution may then be calculated based on the weight of the animal 12 and without conveying the animal 12 further the animal 12 is bled. Alternatively, the animal 12 could be bled and then weighed. Rinsing the circulatory system of the animal with a calculated volume of rinse solution is then started at the multi-task station 34 before a subsequent animal is weighed. The animal 12 may be conveyed to a further processing station whilst the rinse is in progress. Thus, the weighing and rinsing of the animal 12 are conducted at substantially the same location in order to make the process as efficient as possible. In the prior art process that is described in U.S. Pat. No. 6,196,912, which is incorporated by reference hereto, the animal 12 needs to be moved between the weigh station, bleed station, and rinse station 32. Movement of individual animals around the processing site in this way requires tagging of individual animals as described previously. The tagging adds considerable expense to the slaughtering process as well as adding complexity and therefore potential points of failure in the system. Therefore the process of the present invention provides a more reliable, robust, and maintainable installation.

A substantial space saving has also been found by weighing, bleeding, and rinsing at a multi-task station 34, which means that each of the procedures are carried out at substantially the same location on the overhead rail 16. This enables the animal processing system 10 of the present invention to be fitted into existing plants with less cost or interruption to current running of the plant.

A further advantage of the present invention is that there may be an increase in throughput of animals. This arises because animals are being worked on 100% of the time, whereas there is time of no work when the animals are moving between stations in the prior art system. For example, using the prior art process, an animal 12 may be hung up on the overhead rail 16 about every 45 seconds or more. The animal 12 is weighed at the weight scale 28, which takes about 5 seconds or more. The animal 12 then travels on the overhead rail 16 for 5 seconds or more until it reaches the first station where an operator prepares the animal 12 for rinsing. This takes 15 seconds or more. The animal 12 then travels on the overhead rail 16 to the rinse station 32, taking up to 360 seconds or more for travel. At the rinse station 32, the animal 12 is detected and a nozzle is inserted for the rinse to start. This step may take 10 seconds or more. The rinse is then started. Overall there is a potential total cycle time of about 440 seconds when combining the above individual stages.

Using the process of the present invention the animal 12 may be hung up on the overhead rail 16 about every 45 seconds or more. After travelling on the overhead rail 16 for up to 5 seconds or more, the animal 12 is then weighed at the multi-task station 34, taking about 5 seconds or more to achieve a stable weight reading. Without moving the animal 12 from the multi-task station 34, the animal 12 is prepared for rinsing, the nozzle is pulled from the rinse station 32, and then inserted into the animal 12. This takes about 15 seconds in most cases. The rinse is then started. Using these times, the present invention may provide an overall process cycle time of about 75 seconds.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:
1. A method for processing animals, the method including:
providing a carrier for holding a plurality of animals;
providing a multi-task station;
providing a rinse station at the multi-task station that includes one or more hoses and nozzle assemblies and a rinse control means to control and monitor flow of the rinse solution;
locating an animal on at least part of the carrier at the multi-task station;
weighing the animal at the multi-task station;
bleeding the animal at the multi-task station;

providing a volume of rinse solution for introduction into the circulatory system of the animal, wherein the volume of rinse solution is based on the weight of the animal;

initiating a rinse into the animal prior to weighing a subsequent animal at the multi-task station; and introducing the rinse solution into the circulatory system of the animal using a selected hose and attached nozzle assembly, including initiating the rinse by associating a hose with the weighed animal before the subsequent animal is weighed at the multi-task station.

2. A method as in claim 1, including inserting a nozzle assembly into the circulatory system of the animal at the multi-task station.

3. A method as in claim 2, including weighing the animal at the multi-task station and then bleeding the animal at the multi-task station.

4. A method as in claim 2, including bleeding the animal at the multi-task station and then weighing the animal at the multi-task station.

5. A method as in claim 1, including providing a carrier selected from the group consisting of: an overhead rail, an overhead chain, a moving table, a plurality of cradles or a plurality of knock boxes.

6. A method as in claim 1, where providing a carrier further comprises providing an overhead rail having a weight scale.

7. A method as in claim 6, including:
hoisting a stunned animal on a shackle onto the overhead rail;
locating the animal at the multi-task station by conveying it to the multi-task station on the overhead rail;
weighing the animal on the overhead rail at the multi-task station to determine the weight of the animal;
calculating the volume of rinse solution based on the weight of the animal;
providing the volume of rinse solution that is to be introduced into the circulatory system of the animal;
bleeding the animal at the multi-task station; and
initiating a rinse prior to locating a subsequent animal at the multi-task station.

8. A method as in claim 5, including:
(a) providing a plurality of cradles;
(b) locating an animal in a first cradle at the multi-task station;
(c) weighing the animal in the first cradle at the multi-task station to determine the weight of the animal;
(d) calculating a volume of rinse solution based on the weight of the animal;
(e) initiating a rinse of the animal in the first cradle at the multi-task station;
(f) removing the animal in the first cradle from the multi task station; and
(g) repeating b) to f) with a subsequent animal and a second cradle.

9. A method as in claim 5, including:
(a) providing a plurality of knock boxes;
(b) locating an animal in a first knock box at the multi-task station;
(c) weighing the animal in the first knock box at the multi-task station to determine the weight of the animal;
(d) calculating a volume of rinse solution based on the weight of the animal;
(e) initiating a rinse of the animal in the first knock box at the multi-task station;
(f) removing the animal in the first knock box from the multi-task station; and
(g) repeating b) to f) with a subsequent animal in a second knock box.

10. A method as in claim 1, including:
providing a stunning area; and
stunning the animal in the stunning area.

11. A method as in claim 10, wherein the stunning area is separate from the multi-task station.

12. A method as in claim 1, including:
inserting a nozzle assembly into the circulatory system of the animal at the multi-task station;
starting the introduction of the rinse solution into the circulatory system of the animal at the multi-task station; and
subsequently removing the animal from the multi-task station whilst the remainder of the volume of the rinse solution is introduced into the circulatory system of the animal.

13. A method as in claim 12, including preventing a subsequent animal from being weighed until a preset volume of rinse solution has passed through the hose associated with the animal that has been weighed.

14. A method as in claim 1, wherein the animal is a member of the group consisting of: bovine, ovine, swine, poultry, or fish.

* * * * *